(12) United States Patent
Brolles et al.

(10) Patent No.: US 11,932,212 B2
(45) Date of Patent: Mar. 19, 2024

(54) AXLE FOR A VEHICLE

(71) Applicant: VOLVO TRUCK CORPORATION, Gothenburg (SE)

(72) Inventors: Vincent Brolles, Saint Laurent de Mure (FR); Thomas Barillot, Mornant (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/051,717

(22) Filed: Nov. 1, 2022

(65) Prior Publication Data

US 2023/0139342 A1 May 4, 2023

(30) Foreign Application Priority Data

Nov. 3, 2021 (EP) .................... 21206230

(51) Int. Cl.
| | |
|---|---|
| *B60K 1/00* | (2006.01) |
| *B60B 35/02* | (2006.01) |
| *B60B 35/12* | (2006.01) |
| *B60K 1/02* | (2006.01) |
| *B60K 17/16* | (2006.01) |
| *B60T 1/10* | (2006.01) |
| *F16H 37/08* | (2006.01) |

(52) U.S. Cl.
CPC .............. *B60T 1/10* (2013.01); *B60B 35/02* (2013.01); *B60B 35/122* (2013.01); *B60K 1/02* (2013.01); *B60K 17/165* (2013.01); *F16H 37/0806* (2013.01); *B60K 2001/001* (2013.01)

(58) Field of Classification Search
CPC ......... B60T 1/10; B60B 35/02; B60B 35/122; B60K 1/02; B60K 17/165; B60K 2001/001; B60K 17/02; B60K 17/08; B60K 1/00; F16H 37/0806
See application file for complete search history.

(56) References Cited

U.S. PATENT DOCUMENTS

| | | |
|---|---|---|
| 2019/0078675 A1 | 3/2019 | Slesinski et al. |
| 2020/0189543 A1 | 6/2020 | Kurosaki |

FOREIGN PATENT DOCUMENTS

| | | | | |
|---|---|---|---|---|
| CN | 207630963 U | | 7/2018 | |
| CN | 209008397 U | * | 6/2019 | |
| CN | 209683449 U | * | 11/2019 | |
| DE | 102017005165 A1 | | 12/2017 | |
| DE | 102016218068 A1 | | 3/2018 | |
| DE | 102016012174 A1 | | 4/2018 | |
| DE | 102019001339 A1 | | 8/2019 | |
| DE | 102018210897 A1 | * | 1/2020 | ............... B60K 1/00 |
| DE | 102019006668 A1 | | 3/2021 | |
| DE | 102020101157 A1 | * | 7/2021 | |
| DE | 102020101157 A1 | | 7/2021 | |
| EP | 3381774 B1 | | 10/2021 | |
| WO | 18224353 A1 | | 12/2018 | |
| WO | 20200256618 A1 | | 12/2020 | |
| WO | WO-2020256618 A1 | * | 12/2020 | ............... B60K 1/02 |
| WO | 2021121604 A1 | | 6/2021 | |

OTHER PUBLICATIONS

European Search Report in corresponding European Application No. 21206230.1 dated Mar. 9, 2022 (3 pages).

* cited by examiner

*Primary Examiner* — Justin Holmes (74) *Attorney, Agent, or Firm* — Venable LLP; Jeffri A. Kaminski (57) ABSTRACT

An axle for connecting two wheels of a vehicle is provided, The axle includes a retarder configured to generate a braking force.

4 Claims, 8 Drawing Sheets

AXLE FOR A VEHICLE

TECHNICAL FIELD

The invention relates to an improved axle for a vehicle, and more particularly to an axle for an electric vehicle or a hybrid vehicle.

A vehicle generally comprises two axles, respectively a front axle and a rear axle, each connected to wheels. In some embodiments, a vehicle may include one or more front and/or rear axle(s). Each axle can alternatively be none driven or driven axle(s).

A driven axle comprises a powertrain arranged to provide torque to the wheels. The driven axle can be an electric axle (E-axle) which comprises at least an electric motor and a transmission unit. An E-Axle is a compact and economical electric drive solution for Battery Electric Vehicles (BEV), Fuel Cells Electric Vehicles (FCEV) and hybrid vehicles.

The invention can be applied in low-duty, medium-duty and heavy-duty vehicles, such as trucks, buses and construction equipment, as well as in passenger cars. Although the invention will be described with respect to a truck, the invention is not restricted to this particular vehicle type, but may also be used in other vehicles.

BACKGROUND

The transport industry is constantly looking for environmental and safety improvements. To this effect, it is known to provide auxiliary brakes as a supplement to the service brakes of the vehicle. This is typically done in order to increase the life time of the service brakes and to increase the available braking force, since these are otherwise exposed to significant wear due to the heavy loads on the vehicle, especially when driving down steep gradients, the vehicle has to be slowed down before developing a too high speed.

Retarders are examples of auxiliary brakes. A retarder is usually of the hydrodynamic retarder or electromagnetic retarder type. These are arranged on powertrains, after the main gearbox of the vehicle and its clutch device. As the retarder is arranged after the clutch device of the vehicle, it can brake the vehicle even when the clutch is disengaged or when the gearbox is in neutral position.

However, the presence of a retarder on a powertrain leads to space problems. Indeed, the integration of a retarder on a powertrain is space consuming.

Moreover, the transport industry is currently in a process of transition to electro-mobility, which implies the use of electric power to drive vehicles. Electro-mobility is mainly developed to meet increasingly stringent emission regulation requirements and the banning of internal combustion engine vehicles by some cities.

Battery Electric Vehicles (BEV) and Fuel Cells Electric Vehicles (FCEV) generally comprise a regenerative braking system, which allow to decelerate the vehicle without using the service brakes to cope with legal and customer demands. This is only valid when the battery system is able to accept the electric energy created during braking event by the electric motor(s) of the powertrain. During regenerative braking, the kinetic energy of the wheels during deceleration phases is converted into electrical energy using the motor(s) as a generator. This electrical energy is used to charge the battery system. When the battery system is full of energy, it cannot accept any electrical energy without being damaged. Thus, the addition of a retarder will solve this issue since the retarder can be used when the battery system is full, and more generally when needed in complement to the regenerative braking system.

In order to free as much space as possible for batteries, chassis and other large parts, such as aerodynamic profiles, powertrains must be as compact as possible.

SUMMARY

An object of the invention is to provide an auxiliary brake for a vehicle, which auxiliary brake is not space consuming.

The object is achieved by an axle for connecting two wheels of a vehicle, characterized in that the axle comprises a retarder configured to generate a braking force.

By the provision of an axle, which comprises a retarder, the service brakes of the vehicle are supplemented without consuming space on the powertrain.

According to one embodiment, the axle is a driven axle comprising a transmission unit comprising:
  An electric motor;
  A gearbox comprising:
    A primary shaft connected to the electric motor;
    An output shaft parallel to the primary shaft, the output shaft comprising a first output gear, a second output gear and a third output gear;
    An intermediate shaft parallel to the primary shaft, the intermediate shaft comprising:
      a first intermediate gear connected to the primary shaft and to the first output gear,
      a second intermediate gear connected to the second output gear, and
      a third intermediate gear connected to the third output gear; and
    A differential assembly connected to the output shaft.

According to one embodiment, the retarder is connected to the output shaft or to the intermediate shaft.

According to one embodiment, wherein the retarder is connected to the output shaft or to the intermediate shaft via a transmission shaft.

According to one embodiment, the retarder is mounted at a distal end of the output shaft or intermediate shaft, relative to the differential assembly.

According to one embodiment, the retarder is connected to the second or third output gear.

According to one embodiment, the retarder is connected to a proximal end of the intermediate shaft relative to the differential assembly.

According to one embodiment, the axle comprises two electric motors, and the gearbox comprises a primary shaft and an intermediate shaft for each electric motor.

According to one embodiment, the axle is a non-driven axle, the retarder being a wheel driven retarder.

According to one embodiment, the axle comprises a differential assembly and two shafts, each shaft being connected to the differential assembly and to a wheel, the retarder being connected to the differential assembly.

According to one embodiment, wherein the axle comprises two retarders.

According to one embodiment, the axle is a driven axle.

According to a further embodiment, the axle is a non-driven axle.

A further object of the invention is a vehicle comprising an axle as described above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
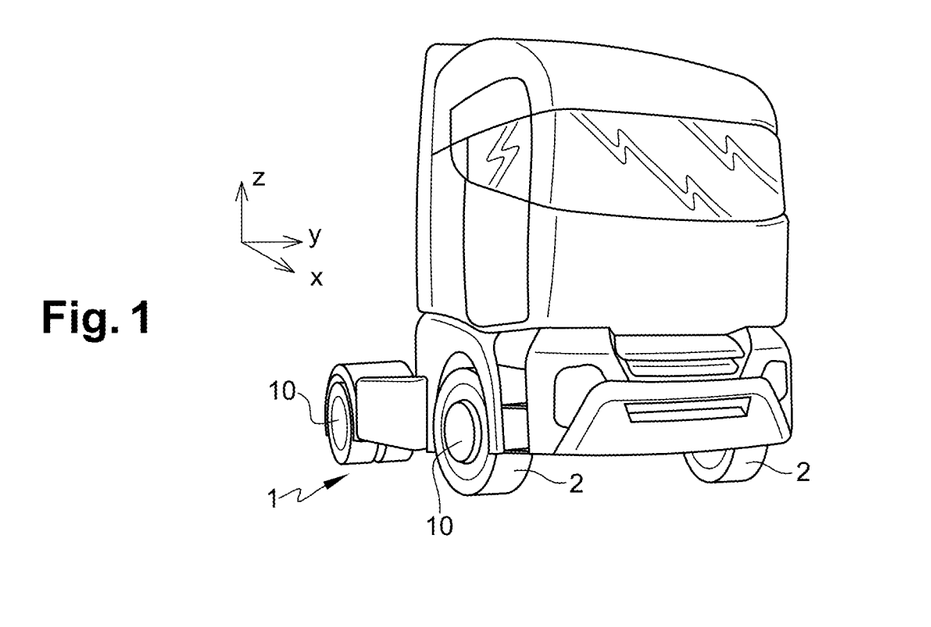
FIG. 1 is a perspective view of a vehicle, comprising an axle according to the invention.

FIG. 1 shows a vehicle 1, comprising two axles 10, respectively a front axle and a rear axle, each connected to wheels 2. The vehicle 1 can be an electric, fuel cell or hybrid vehicle, i.e. a vehicle using electric energy as a source of power. In the example, the vehicle is a truck.

In an alternative embodiment, the vehicle may include one or more front and/or rear axle(s). Each axle can alternatively be none driven or driven axle(s).

The present description is given in an X, Y, Z referential where X is defined as the longitudinal direction of the vehicle 1, Y is defined as the transversal direction and Z is defined as the vertical direction of the vehicle 1.

FIGS. 2 to 18 show an axle 10 for connecting two drive wheels 2 or two non driven wheels 2' of a vehicle 1 (FIG. 1). The axle 10 comprises a retarder 12 configured to generate a braking force.

As illustrated in FIGS. 2 to 13 and 17, the axle 10 can be a driven axle. The axle 10 can comprise a transmission unit 14 comprising:

An electric motor EM1;
A gearbox 16; and
A differential assembly 18.

The electric motor EM1 can be on one side of the differential assembly 18 and the gearbox 16 on the other side, opposite to the electric motor EM1.

The retarder can be axle driven or wheel driven.

The gearbox 16 is configured to connect the electric motor EM1 to the differential assembly 18. The differential assembly 18 can comprise a bevel set crown wheel 45 connected to the gearbox 16.

As illustrated in FIGS. 2 to 13, the gearbox 16 can comprise:

A primary shaft 20 connected to the electric motor EM1;
An output shaft 22 parallel to the primary shaft 20 and connected to the differential assembly 18; and
An intermediate shaft 24 parallel to the primary shaft 20.

More precisely, the output shaft 22 can comprise a first output gear 26, a second output gear 28 and a third output gear 30. The intermediate shaft 24 can comprise a first intermediate gear 32, a second intermediate gear 34, and a third intermediate gear 36. The primary shaft 20 can comprise a gear 38. The first intermediate gear 32 can be connected to the gear 38 of the primary shaft 20, and to the first output gear 26 of the output shaft 22.

The second intermediate gear 34 can be connected to the second output gear 28, and the third intermediate gear 36 can be connected to the third output gear 30.

Typically, the gear 38 can be fixed in rotation with the primary shaft 20. For example, the gear 38 can be integral with the primary shaft 20, meaning that the gear 38 and the primary shaft 20 form a unique part.

The intermediate shaft 24 can have a first extremity E1 and a second extremity E2. The first intermediate gear 32 can be located at the first extremity E1 of the intermediate shaft 24. The output shaft 22 can have a first extremity E11 and a second extremity E12. The first output gear 26 can be located at the first extremity E11 of the output shaft 22. The first extremity E1 of the intermediate shaft 24 and the first extremity E11 of the output shaft 22 can be proximal to the differential assembly 18, and more precisely to the bevel set crown wheel 45.

As shown in FIGS. 2 to 13 and 17, the axle 10 can comprise two drive shafts 40. Each drive shaft 40 can be connected to the differential assembly 18, and more precisely to the bevel set crown wheel 45, and to a drive wheel 2.

The intermediate shaft 24 allow to obtain a first gear module. The electric motor EM1 is linked to the first gear module. The output shaft 22 allow to obtain a second gear module. The first gear module and the second gear module are arranged to obtain the gearbox 16.

The first intermediate gear 32 can be fixed in rotation with respect to the intermediate shaft 24, the second intermediate gear 34 and a third intermediate gear 36. The first intermediate gear 32, the second intermediate gear 34 and the third intermediate gear 36 can have each a different outer diameter and/or a different number of teeth. Typically, the first intermediate gear 32 can have a diameter that is greater than that of the second intermediate gear 34, and the second intermediate gear 34 can have a diameter that is greater than that of the third intermediate gear 36.

In the example, the first intermediate gear 32 is integral with the intermediate shaft 24 (i.e. made in one-piece). However, the first intermediate gear 32 could be fixedly attached to the intermediate shaft 24 as well, using fasteners, welding, splines or press-fitting or any other means. Besides, the second intermediate gear 34 and the third intermediate gear 36 are, in this particular arrangement, by default each free to rotate around the intermediate shaft 24.

The axle 10 can have a transmission housing (not shown). The transmission housing can include a central part receiving the differential assembly 18, and more precisely the bevel set crown wheel 45, and two lateral parts extending on either side of the central part. The two lateral parts can receive the two drive shafts 40 respectively connected to the drive wheels 2. The electric motor EM1 can be arranged so as to transmit a driving torque (or motor torque) to the drive shafts 40 via the differential assembly 18, and more precisely via the bevel set crown wheel 45.

In this embodiment, the electric motor EM1, the differential assembly 18, the gearbox 16 and the drive wheels 2 are arranged to form the transmission unit. The gearbox 16 includes a multiple speed ratio.

Typically, the electric motor EM1 can be attached to the transmission housing by any appropriate means and in particular by bolting. Such fastening means are known as such, that is why they are not shown on the figures. Alternatively, the housing of the electric motor EM1 is integral with the transmission housing.

The electric motor EM1 can be offset from a longitudinal direction of the vehicle 1.

The axis of rotation of electric motor EM1 can be parallel to the longitudinal direction of the vehicle 1. Accordingly, the transmission unit 14 is said to be in a longitudinal configuration relative to the vehicle 1.

The gearbox 16 can also include a first coupling member 42 (also known as "gear shifting mechanism" or "dog clutch element"), which can be arranged along the output shaft 22. The first coupling member 42 can be moved between an engaged position, in which it couples the first output gear 26 in rotation with the output shaft 22, and a neutral position, in which it allows the first output gear 26 to rotate freely around the output shaft 22.

The gearbox 16 can also include a second coupling member 44, which can be arranged along the intermediate shaft 24. The second coupling member 44 can be movable between a first position in which it couples the second intermediate gear 34 in rotation with the intermediate shaft 24, a second position in which it couples the third intermediate gear 36 in rotation with the intermediate shaft 24, and a neutral position in which it does not prevent the second and third intermediate gears 34, 36 from rotating around the intermediate shaft 24.

In one alternative embodiment, the second coupling member 44 could be arranged along the output shaft 22. In this case, the second coupling member 44 would be movable between a first position in which it would couple the second output gear 28 in rotation with the output shaft 22, a second position in which it would couple the third output gear 30 in rotation with the output shaft 22, and a neutral position in which it would not prevent the second and third output gears 28, 30 from rotating around the output shaft 22.

At least one of the first coupling member 42 and the second coupling member 44 (preferably both coupling members) can be a dog clutch.

In an embodiment, the transmission unit 14 can comprise two electric motors EM1 and EM2 (see FIGS. 8 to 11). The two motors EM1 and EM2 can be identical in that they have the same characteristics (supply voltage, operating current, torque-speed characteristic, mechanical power, etc.). For example, the mechanical power of EM1 and EM2 can be between 50 kW to 500 kw. Alternatively, the two electric motors EM1 and EM2 can be different.

According to this embodiment, the transmission unit 14 can comprise two primary shafts 20 and two intermediate shafts 24, as described above, for connecting each electric motor EM1, EM2 to the output shaft 22.

The electric motors EM1 and/or EM2 can be AC type motors (synchronous or asynchronous). Alternatively, the electric motors EM1 and/or EM2 can be DC type motors as well (brushed). More generally, any electric motor is suitable.

The retarder 12 can be connected to the output shaft 22, as shown in FIGS. 2 to 6, 8 and 11.

Figure 7:
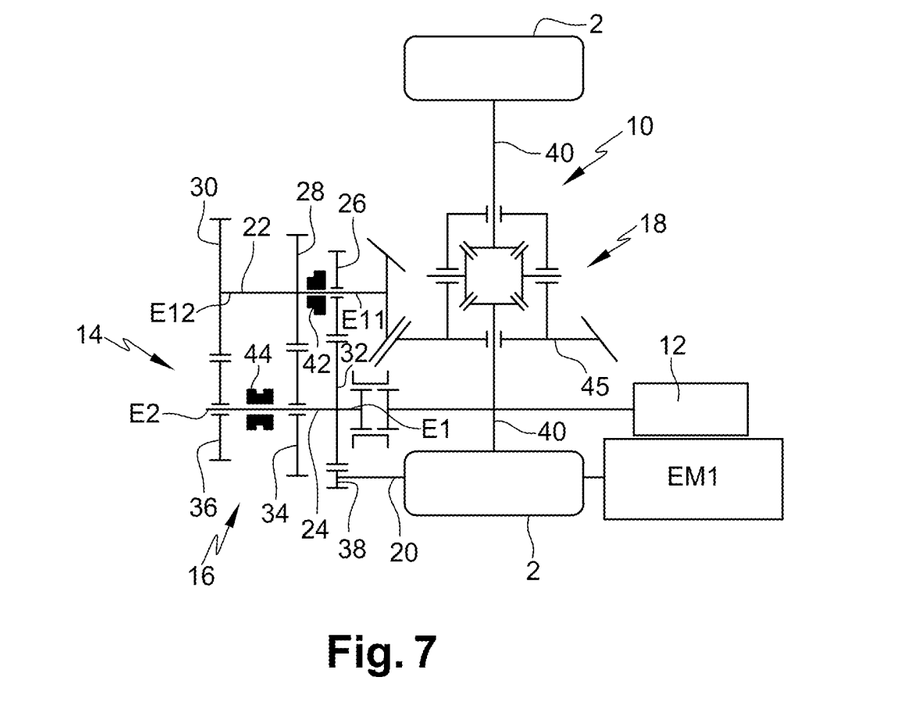
FIG. 7 is a schematic view of an axle according to a sixth embodiment of the invention.
Figure 9:
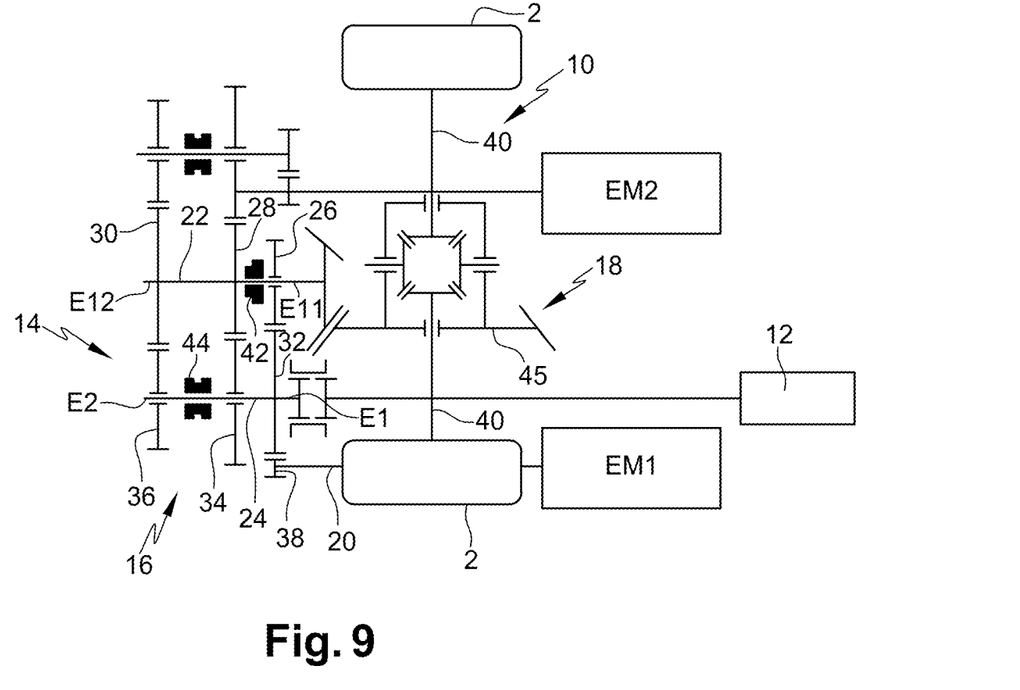
FIG. 9 is a schematic view of an axle according to an eighth embodiment of the invention.
Figure 10:
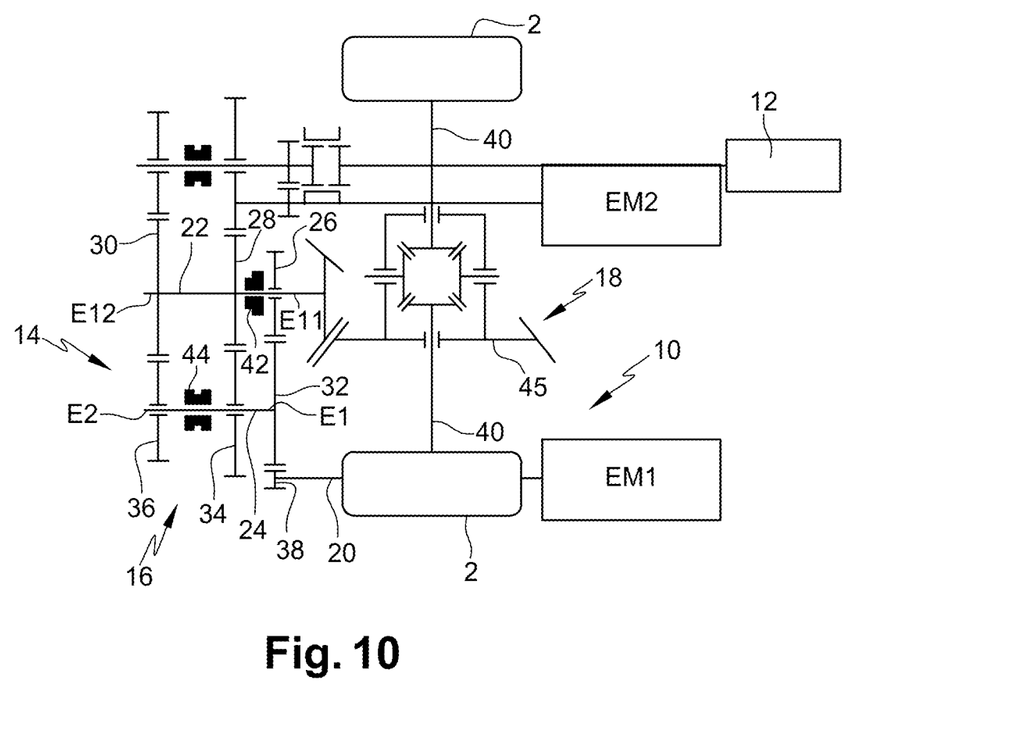
FIG. 10 is a schematic view of an axle according to a ninth embodiment of the invention.

In alternative, the retarder 12 can be connected to the intermediate shaft 24, as shown in FIGS. 7, 9, 10.

The retarder 12 can be mounted at the distal end E12 of the output shaft 22 or at the distal end E2 of the intermediate shaft 24 relative to the differential assembly 18 (FIGS. 2, 8, 11, 12, 13).

The retarder 12 can be mounted at the proximal end E1 of the intermediate shaft 24 relative to the differential assembly 18 (FIGS. 7, 9, 10).

Figure 3:
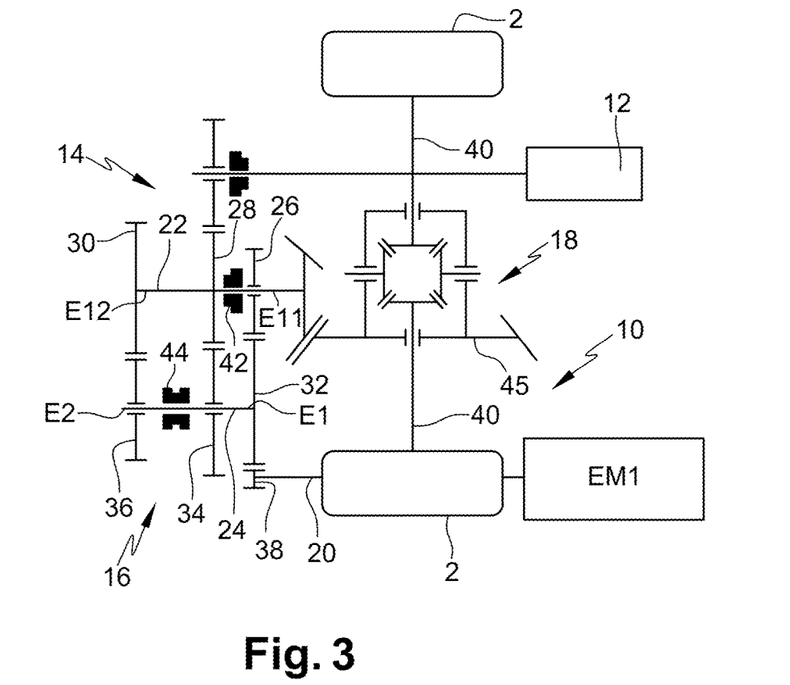
FIG. 3 is a schematic view of an axle according to a second embodiment of the invention.
Figure 4:
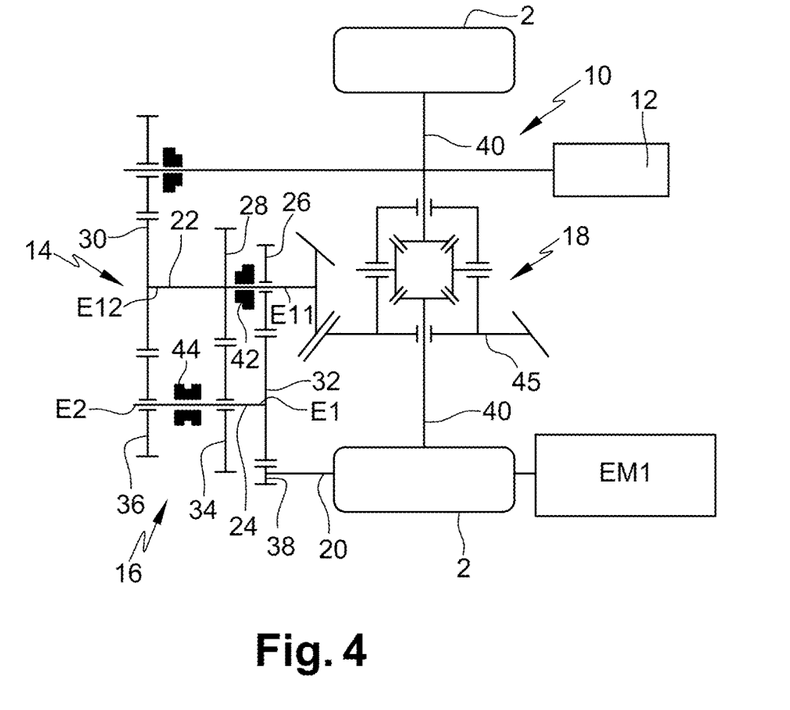
FIG. 4 is a schematic view of an axle according to a third embodiment of the invention.

The retarder 12 can be mounted transversely to the electric motor EM1 with respect to the transversal direction Y of the vehicle 1 (FIGS. 3, 4, 7).

Figure 5:
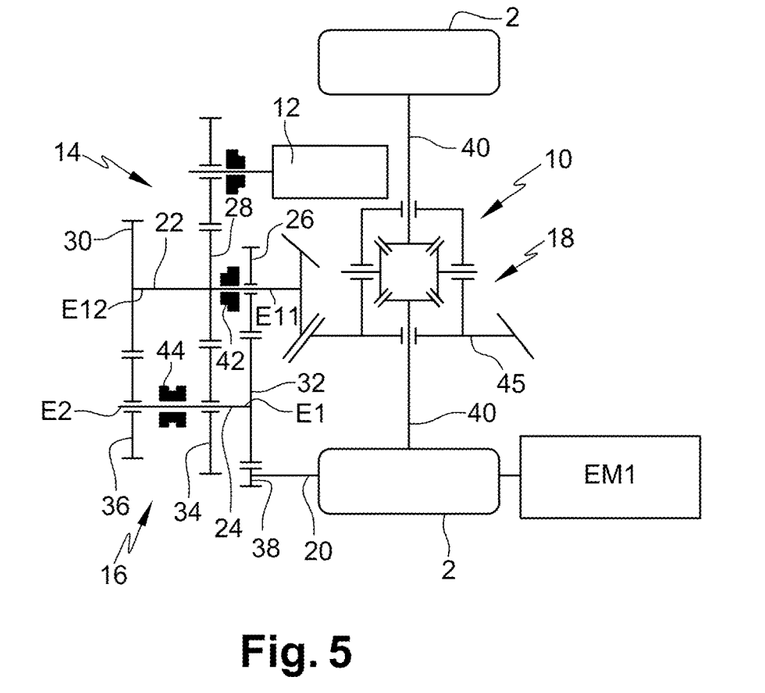
FIG. 5 is a schematic view of an axle according to a fourth embodiment of the invention.
Figure 6:
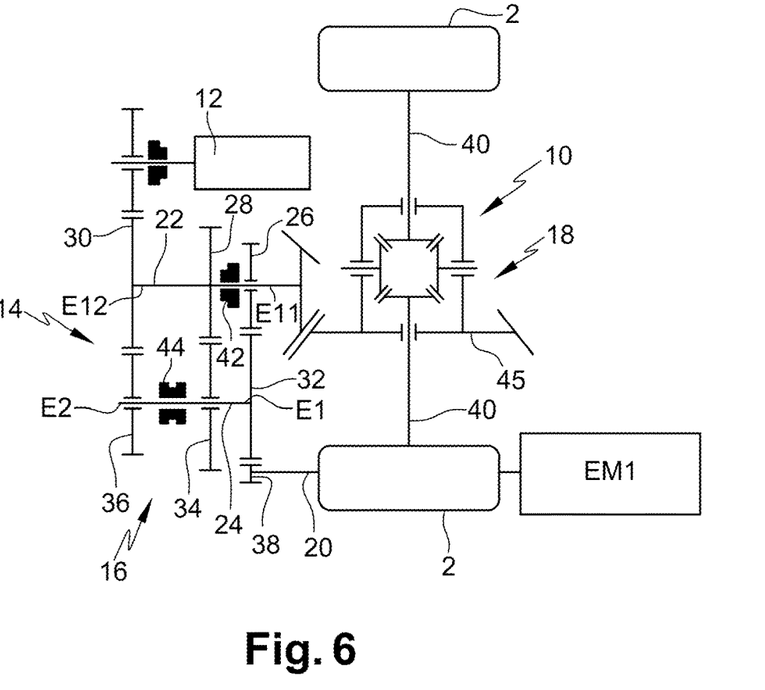
FIG. 6 is a schematic view of an axle according to a fifth embodiment of the invention.

The retarder 12 can be mounted on top of the gearbox 16 (FIGS. 5, 6).

The retarder 12 can be mounted longitudinally beside the electric motor EM1, EM2, opposite to the gearbox 16, with respect to the longitudinal direction X of the vehicle 1 (FIGS. 9, 10).

Figure 2:
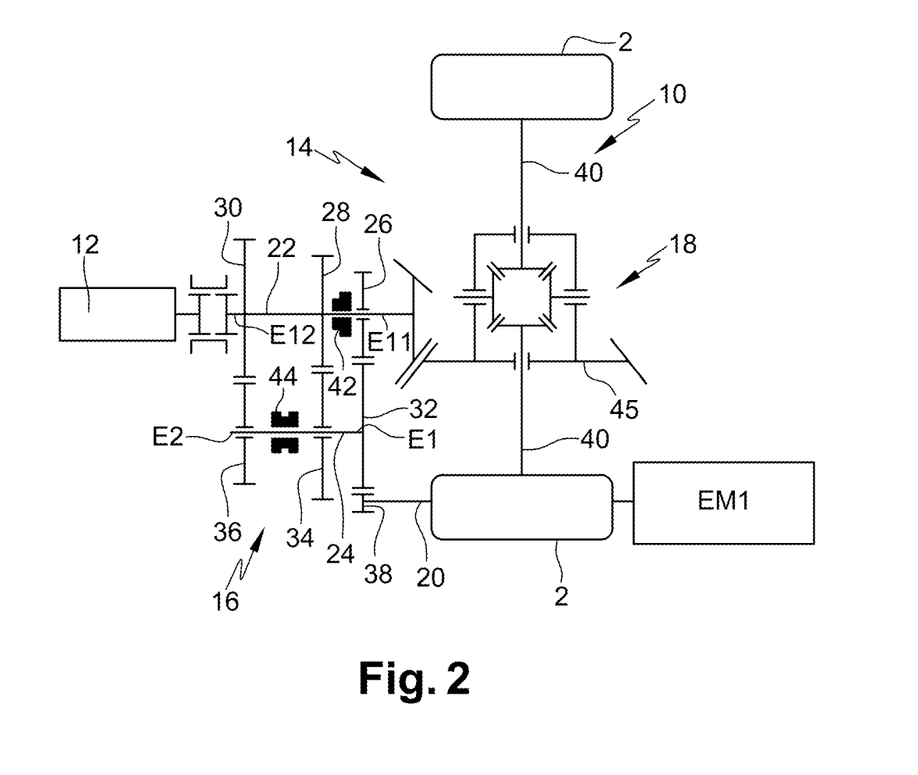
FIG. 2 is a schematic view of an axle according to a first embodiment of the invention.
Figure 8:
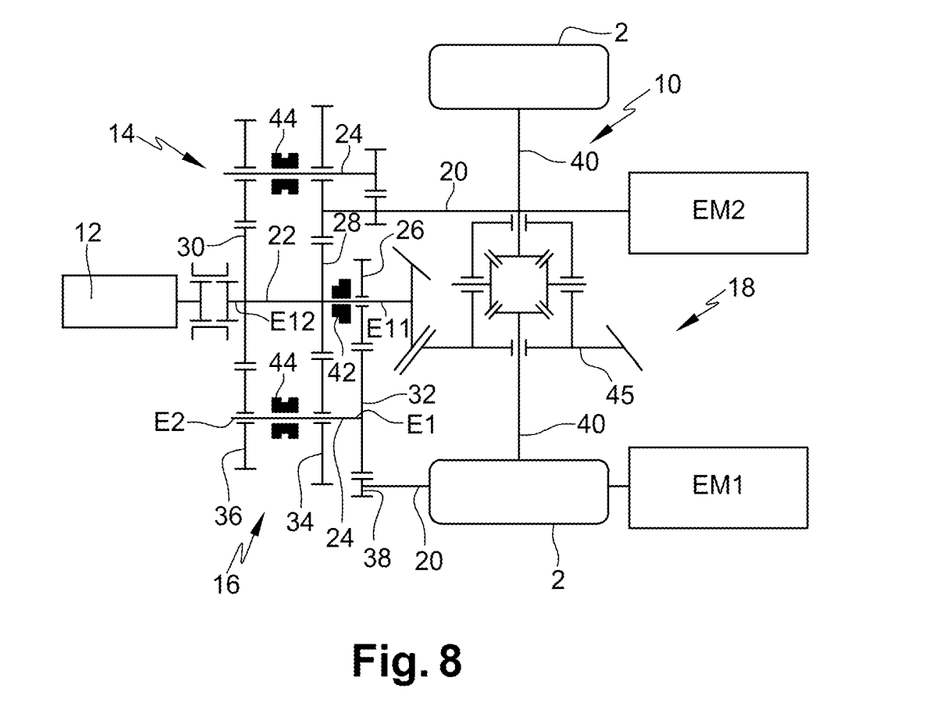
FIG. 8 is a schematic view of an axle according to a seventh embodiment of the invention.
Figure 11:
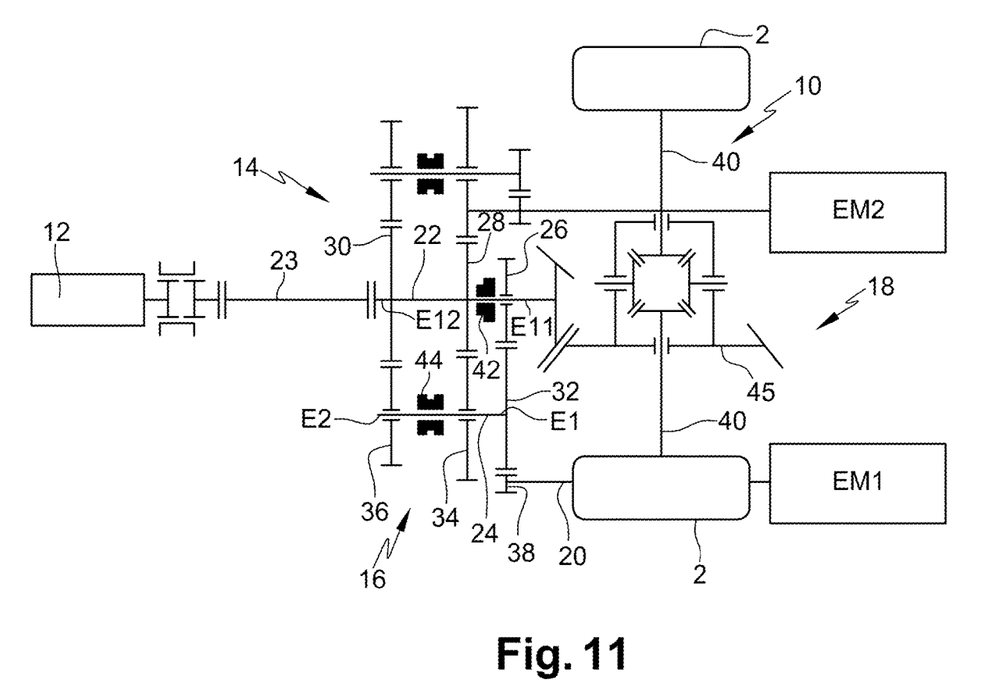
FIG. 11 is a schematic view of an axle according to a tenth embodiment of the invention.

In an embodiment, the retarder 12 can be connected to the second extremity E12 of the output shaft 22, as illustrated in FIGS. 2, 8 and 11. For example, a gear arranged on the second extremity E12 of the output shaft 22 meshes with a gear of the retarder 12.

In another embodiment, the retarder 12 can be connected to the second output gear 28 of the output shaft 22 (FIGS. 3, 5). For example, the second output gear 28 meshes with a gear of the retarder 12.

In another embodiment, the retarder 12 can be connected to the third output gear 30 of the output shaft 22 (FIG. 4, 6). For example, the third output gear 30 meshes with a gear of the retarder 12.

In another embodiment, the retarder 12 can be connected to the intermediate shaft 24, as shown in FIGS. 7, 9 and 10. More precisely, the retarder 12 can be connected to the first extremity E1 of the intermediate shaft 24. For example, a gear arranged on the first extremity E1 of the intermediate shaft 24 meshes with a gear of the retarder 12. In alternative, the retarder 12 can be connected to the second extremity E2 of the intermediate shaft 24. For example, a gear arranged on the second extremity E2 of the intermediate shaft 24 meshes with a gear of the retarder 12.

Figure 12:
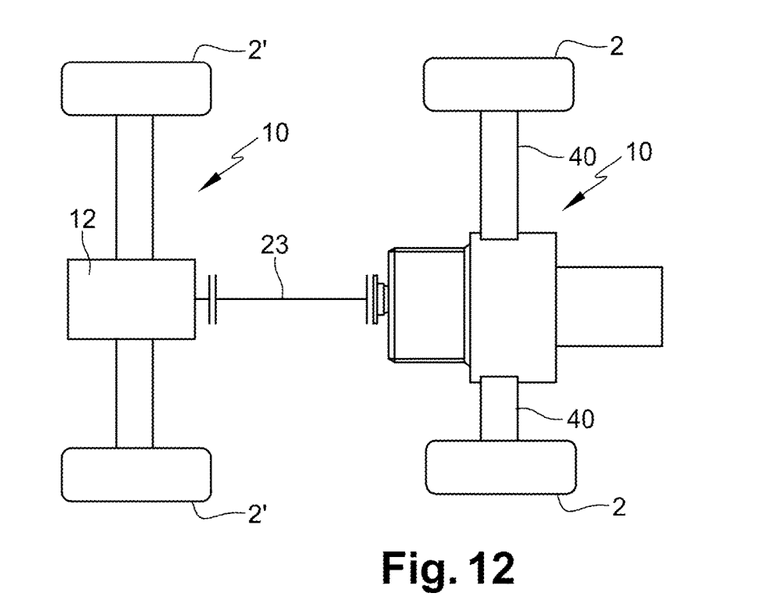
FIG. 12 is a schematic view of an axle according to an eleventh embodiment of the invention.
Figure 13:
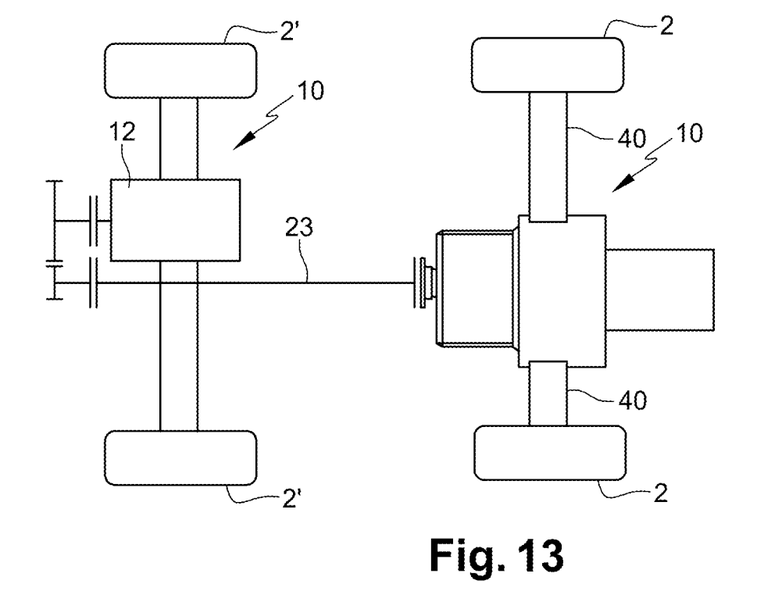
FIG. 13 is a schematic view of an axle according to a twelfth embodiment of the invention.
Figure 14:
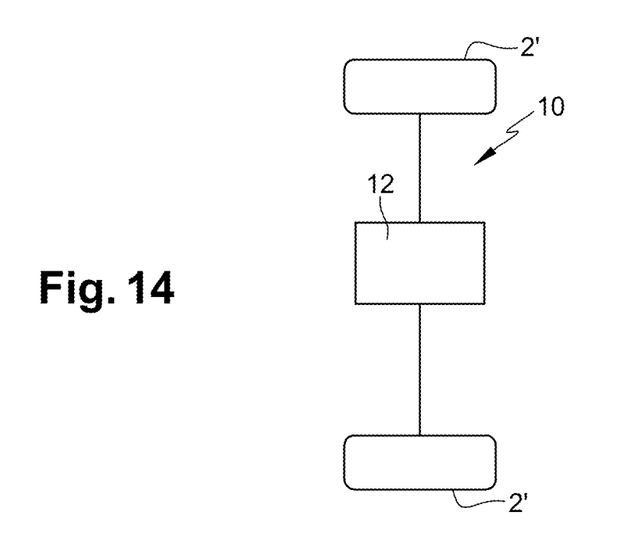
FIG. 14 is a schematic view of an axle according to a thirteenth embodiment of the invention.

In an embodiment illustrated in FIGS. 11, 12 and 13, the retarder 12 can be connected to the output shaft 22 or to the intermediate shaft 24 via a transmission shaft 23. Therefore the retarder 12 can be mounted on a chassis of the vehicle 1 or on a non driven axle.

As illustrated in FIGS. 14 to 16 and 18, the axle 10 can be a non driven axle. Therefore, the retarder 12 can be wheel driven.

Figure 15:
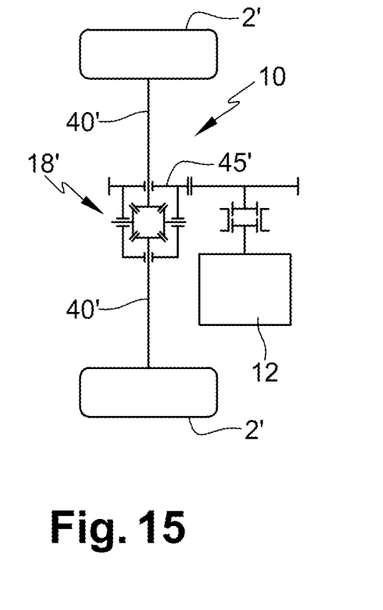
FIG. 15 is a schematic view of an axle according to a fourteenth embodiment of the invention.
Figure 16:
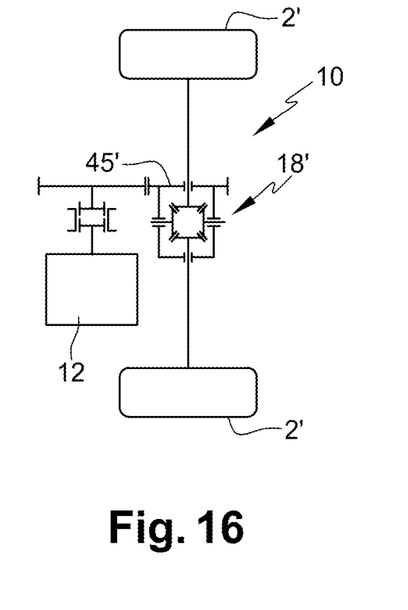
FIG. 16 is a schematic view of an axle according to a fifteenth embodiment of the invention.

The axle 10 can comprise a differential assembly 18' and two shafts 40', each shaft 40' being connected to the differential assembly 18' and to a wheel 2 (FIGS. 15, 16). The retarder 12 can be connected to the differential assembly 18'. The differential assembly 18' can comprise a bevel set crown wheel 45'. Each shaft 40' can be connected to the bevel set crown wheel 45'. The retarder 12 can be connected to the bevel set crown wheel 45'.

The axle 10 can be a rear or a front axle.

The retarder 12 can be located downstream or upstream of the axle 10 relative to the longitudinal direction of the vehicle 1.

Figure 17:
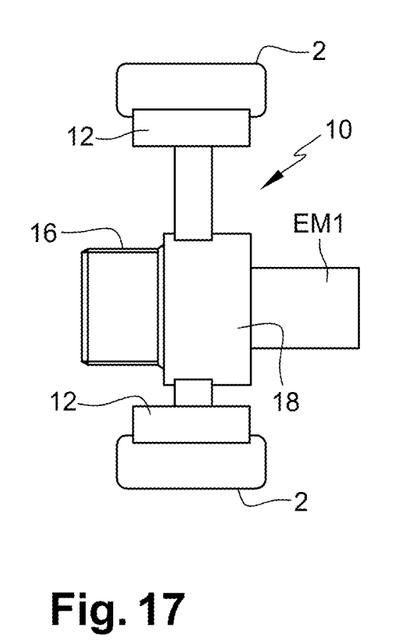
FIG. 17 is a schematic view of an axle according to a sixteenth embodiment of the invention.
Figure 18:
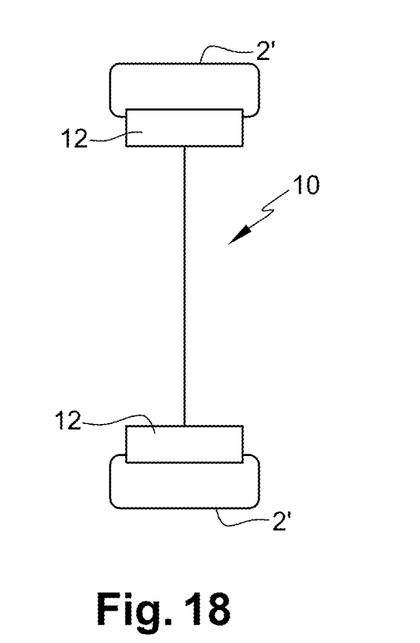
FIG. 18 is a schematic view of an axle according to a seventeenth embodiment of the invention.

As illustrated in FIGS. 17 and 18, the axle 10 can comprise two retarders 12. The axle 10 comprising two retarders 12 can be a driven or a non driven axle.

It is to be understood that the present invention is not limited to the embodiments described above and illustrated in the drawings; rather, the skilled person will recognize that many changes and modifications may be made within the scope of the appended claims.

The invention claimed is:

1. A driven axle for connecting two wheels of a vehicle, the axle comprises:
   a retarder configured to generate a braking force;
   a transmission unit comprising:
      an electric motor;
      a gearbox comprising:
         a primary shaft connected to the electric motor;
         an output shaft parallel to the primary shaft, the output shaft comprising a first output gear, a second output gear and a third output gear;
         an intermediate shaft parallel to the primary shaft, the intermediate shaft comprising:
            a first intermediate gear connected to the primary shaft and to the first output gear,
            a second intermediate gear connected to the second output gear,
            and a third intermediate gear connected to the third output gear;
      and a differential assembly connected to the output shaft, wherein the retarder is connected to a proximal end of the intermediate shaft relative to the differential assembly.

2. The axle according to claim 1, wherein the retarder is connected to the second or third output gear.

3. The axle according to claim 1, wherein the axle comprises two retarders.

4. A vehicle comprising an axle according to claim 1.

* * * * *